Dec. 30, 1969   L. D. MASSER   3,486,768
FIFTH WHEEL DOLLY WITH AIR SUSPENSION
Filed Feb. 15, 1968   2 Sheets-Sheet 1
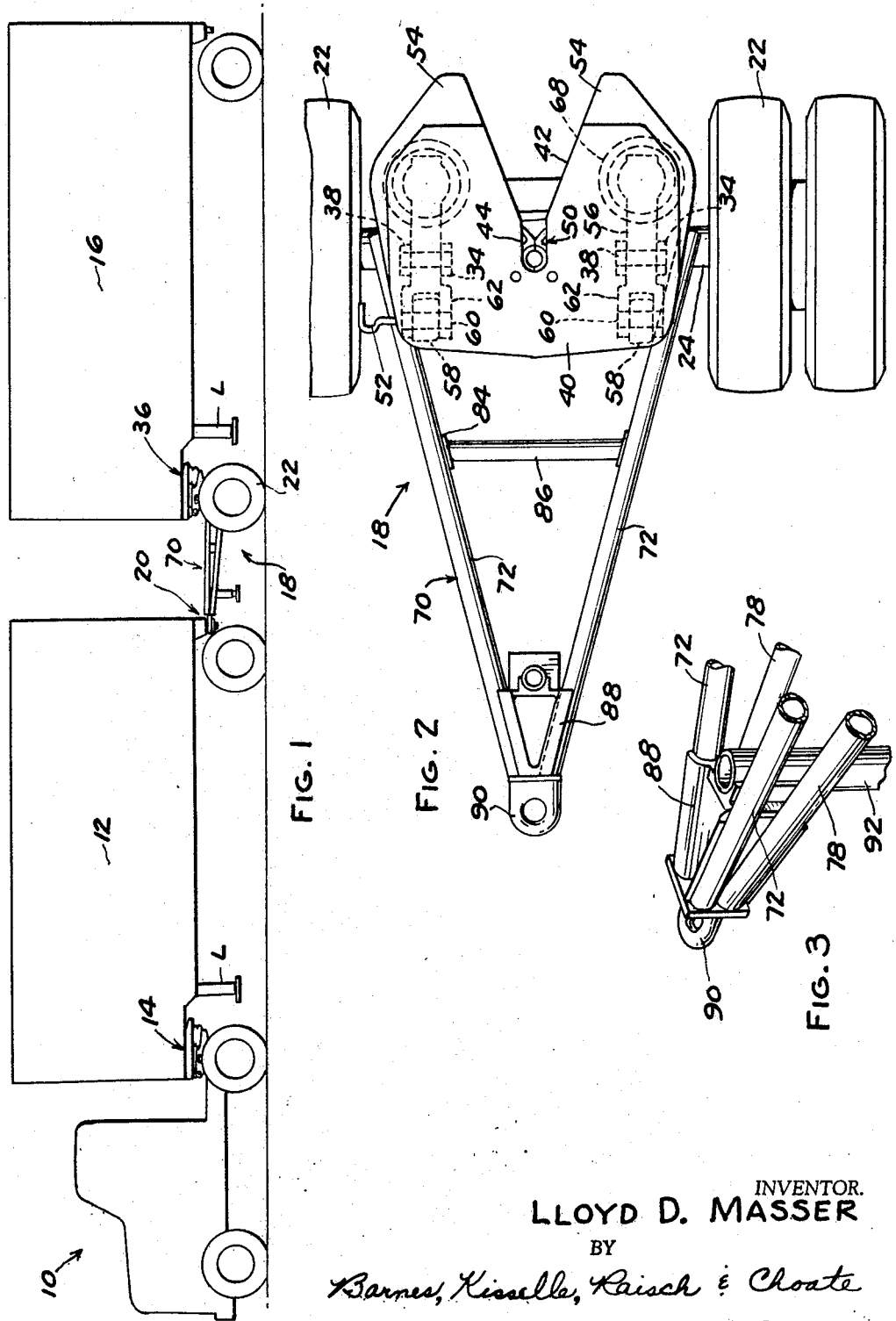
INVENTOR.
LLOYD D. MASSER
BY
Barnes, Kisselle, Raisch & Choate
ATTORNEYS

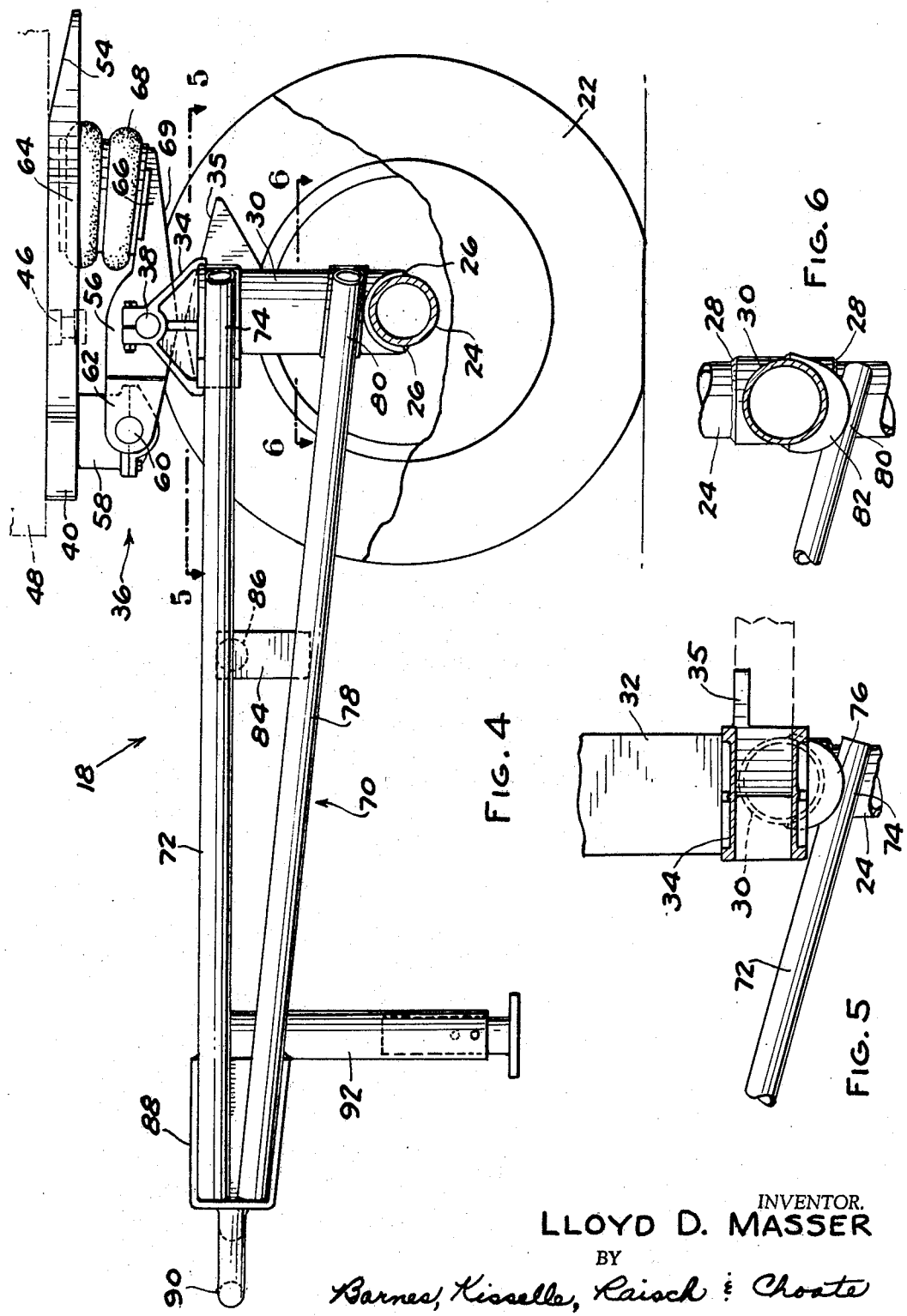

United States Patent Office 3,486,768
Patented Dec. 30, 1969

3,486,768
FIFTH WHEEL DOLLY WITH AIR SUSPENSION
Lloyd D. Masser, Muskegon, Mich., assignor to Neway Equipment Company, Muskegon, Mich., a corporation of Michigan
Filed Feb. 15, 1968, Ser. No. 705,820
Int. Cl. B62d 53/08
U.S. Cl. 280—476      9 Claims

ABSTRACT OF THE DISCLOSURE

Fifth wheel dolly for semitrailers has air springs in load-transmitting relation between fifth wheel plate and a pair of levers pivoted to the fifth wheel plate and rockably mounted on a rigid frame and axle assembly supported by two ground-engaging wheels.

---

The invention relates to a dolly of the type used to convert a semitrailer into a full trailer. Such a dolly has a frame with a pair of ground-engaging wheels suspended therefrom and has a fifth wheel plate thereon adapted for connection to the fifth wheel plate at the forward end of a semitrailer.

In conventional fifth wheel dollys, the lower fifth wheel plate is mounted on a frame and the axle and wheels are suspended from the frame through a conventional suspension which incorporates a spring structure. In general, conventional fifth wheel dollys are massive, expensive, and heavy. Where maximum load laws are in effect, the weight of a conventional dolly unduly cuts down permissible payload of a trailer with which the dolly is used. Also, the weight of a conventional dolly makes it difficult, if not impossible, to move the dolly by hand when it is disconnected from a semitrailer. This unduly complicates procedures in freight loading and unloading areas where semitrailers and dollys frequently must be shifted from one place to another independently.

The object of this invention is to provide a relatively simple, improved fifth wheel dolly structure which is less expensive and lighter weight than those known heretofore and which can be easily manipulated by hand.

In general, the invention contemplates a light weight but strong, substantially rigid frame and axle assembly on which the fifth wheel unit is mounted. All of the resilient spring structure is interposed between the fifth wheel plate and the trunnion mount of the fifth wheel unit on the frame. The draft tongue comprises an open framework of relatively light-weight, strong structural members. The center of gravity of the fifth wheel unit is to the rear of the dolly axle so that it counterbalances at least in part the weight of the draft tongue. One form of the invention is shown in the accompanying drawings.

FIG. 1 is a diagrammatic side elevation of a highway rig illustrating the dolly of the present invention in use.

FIG. 2 is an enlarged top plan view of the dolly.

FIG. 3 is a fragmentary perspective view of the forward end of the draft tongue.

FIG. 4 is a generally side elevational view of the dolly with parts broken away and shown in section to illustrate structural details.

FIG. 5 is a sectional view on line 5—5 of FIG. 4.

FIG. 6 is a sectional view on line 6—6 of FIG. 4.

Shown in FIG. 1 is a tractor 10 connected to a semitrailer 12 through a fifth wheel 14. A second semitrailer 16, which may be identical to semitrailer 14, has been converted to a full trailer by means of a fifth wheel dolly 18 according to the present invention. Trailer 16 and its dolly 18 are shown as being towed behind trailer 14 through a draft connection 20.

Dolly 18 has a pair of ground-engaging wheels 22 mounted on an axle 24. Rigidly secured on the axle as by welding 26, 28 are two laterally spaced, upright pedestals 30 generally adjacent opposite ends of the axle. A cross brace 32 extends between the top portions of the pedestals and is anchored thereto as by welding. Axle 24, pedestals 30, and brace 32 form a substantially rigid axle and frame assembly. Trunnion blocks 34 are mounted generally atop pedestals 30 and are anchored in place by such means as welding to brace 32. The trunion blocks form substantially rigid upward extensions of the axle-frame assembly. A support 35 projects rearwardly of each pedestal for a purpose to be described.

A fifth wheel unit 36 having generally the structure disclosed in U.S. Patent No. 3,137,515 is rockably mounted on trunnion blocks 34 through trunnion pins 38. The fifth wheel unit includes a fifth wheel plate 40 which has a rearwardly opening slot with side walls 42 which converge forwardly into a throat 44 for receiving a kingpin 46 which depends from a fifth wheel plate 48 beneath the forward end of semitrailer 16. The kingpin is releasably retained by a locking device 50 operated by conventional mechanism including an operating handle 52. Fifth wheel plate 40 has tail ramps 54 upon which fifth wheel plate 48 rides upwardly when trailer 16 and dolly 18 are coupled.

Fifth wheel plate 40 is rockably mounted on trunnion pins 38 through lever means which, in the illustrated form of the invention, comprises a pair of laterally spaced levers 56. For this purpose, plate 40 has a pair of depending blocks 58 pivotally connected at 60 between bifurcated forward end portions 62 of levers 56. Pivotal connections 60 incorporate torsion rubber bushings which resist relative swinging movement of plate 40 and levers 56 about the pivots, as disclosed more in detail in the above-mentioned patent.

Plate 40 and levers 36 have portions 64 and 66 respectively to the rear of trunnions 38, and air springs 68 are disposed in load-transmitting relation between these portions. Air springs 68 are preferably provided with air under pressure by means of a conventional pneumatic system which includes height control valving. The valving may be arranged to provide equal pressure to both springs 68 or may control the air pressure in the two springs individually if lateral leveling forces on fifth wheel plate 40 are desired. In either event, the valving is conventional and is not illustrated.

For purposes to be described, rearward portions 66 of levers 56 have undersurfaces 69 aligned with supports 35; the common axis of trunnions 38 is disposed somewhat forwardly of the axis of axle 24 (FIG. 4); and the center of gravity of fifth wheel unit 36 is to the rear of the axes of trunnions 38 and axle 24. The torsion rubber bushings in pivots 60 are arranged to be at zero stress when air springs 68 are partially collapsed from the position of FIG. 4.

Draft tongue 70 comprises an open framework of relatively light weight, strong members which are illustrated as being of tubular form. These include a first pair of members 72 anchored at their rearward end portions 74 as by welding to receptacles 76 in turn welded to upper portions of pedestals 30. Members 72 converge toward each other in a forward direction and extend generally horizontally when dolly 18 is in use. A second pair of members 78 are welded at their rearward portions 80 to receptacles 82 in turn welded to lower portions of pedestals 30. Members 38 converge toward each other and are angled upwardly toward horizontal members 72 in a forward direction. The pairs of members are braced vertically at 84 and horizontally at 86.

The forward end portions of the draft tongue members are anchored as by welding to a tapered gusset 88 which terminates in an eye 90 adapted to be connected to draft attachment 20. Gusset 88 supports a vertical telescoping tube type landing gear 92 for supporting the forward end of the draft tongue when dolly 18 is out of use. The members of draft tongue 70 provide strong support against lateral forces thereon during use. Lower members 78 provide strong support against torsional forces such as brake forces acting on axle 24. As will be apparent, the two members 72, 78 at each side of the draft tongue can be replaced by a single member such as a channel having sufficient depth to bear such torsional forces.

In use, it may be assumed that dolly 18 is coupled with semitrailer 16, thereby converting the semitrailer into a full trailer, and that draft tongue 70 is connected with draft attachment 20 on semitrailer 12. When trailer 16 rolls over uneven ground, the forward end of the trailer tends to move up and down relative to dolly 18, and fifth wheel plate 40 on the dolly follows these movements. The forward end portions of levers 56 also follow these movements, and the levers rock about the fulcrum mounts provided by trunnions 38. This rocking produces a scissoring movement of the rearward portions 64 of fifth wheel plate 40. This scissoring action is controlled primarily by air springs 68 with some assistance from rubber-bushed pivots 60.

Fifth wheel plate 40 moves upwardly and downwardly in a substantially level rectilinear path. Since the axis of trunnions 38 is forward of the axis of axle 24, a portion of the vertical load of trailer 16 on dolly 18 is exerted downwardly on draft tongue 70 to minimize vertical chucking of eye 90 relative to draft attachment 20.

To uncouple dolly 18 from trailer 16, landing gear leg L on the trailer is first extended to support the forward end of the trailer. Kingpin locking device 50 is released by manipulation of handle 52, and dolly 18 is withdrawn from beneath the trailer. Since the center of gravity of fifth wheel unit 36 is to the rear of trunnions 38, when the dolly has been uncoupled from trailer 16 the rearward portion of the fifth wheel unit rocks downwardly or clockwise, as FIG. 4 is viewed, about trunnions 38 to a position in which the undersurfaces 69 of levers 56 come to rest on supports 35. This lowers tail ramps 54 so that they will ride under fifth wheel plate 48 on a tractor 16 when the dolly is again coupled to the trailer. If further lowering of the tail ramps is desired, air can be exhausted from air springs 68, permitting fifth wheel plate 40 to rock downwardly about pivots 60 to the position in which the torsion rubber bushings in the pivots are at approximately zero stress.

To recouple dolly 18 with trailer 16, the dolly is backed under the forward end of the trailer. It is during recoupling that a fifth wheel structure on a dolly or tractor is subjected to the most severe treatment. First of all, upper fifth wheel plate 48 strikes tail ramps 54. However, at this time in the present structure, the impact is absorbed to a great extent by air springs 68. When kingpin 46 homes in throat 44, another severe impact results. However, this impact tends to rock the forward ends of levers 56 downwardly with consequent upward rocking of the rearward ends of the levers; and this rocking is cushioned by springs 68. Some cushioning is also provided at rubber-bushed pivots 60.

Substantially the entire resilient spring structure is incorporated into the fifth wheel unit 36 itself, which makes it possible to utilize the strong, rigid, lightweight axle and frame assembly disclosed herein. The weight of the fifth wheel unit itself is very little, if any, more than a unit in which springs are not incorporated. These factors, coupled with the use of an open framework draft tongue, result in a dolly so light that it can be conveniently manipulated by hand. Since the center of gravity of fifth wheel unit 36 is rearward of the axis of axle 24, its weight counterbalances substantially the weight of draft tongue 70 so that the draft tongue can be relatively easily lifted and carried in the course of manual manipulation of the dolly.

I claim:
1. A fifth wheel dolly comprising,
   axle means and a pair of ground-engaging wheels mounted thereon,
   means providing a frame and a direct connection between said frame and axle means so that said frame and axle means from a substantially rigid assembly
   substantially rigid lever means secured on said frame by a fulcrum mount,
   a fifth wheel member having a pivotal connection to said lever means longitudinally spaced in one direction from said fulcrum mount,
   said fulcrum mount and pivotal connection having axes substantially parallel to said axle means,
   said fifth wheel member and lever means having portions longitudinally spaced in the other direction from said fulcrum mount which swing toward and away from each other about said pivotal connection,
   spring means disposed in vertical-load-transmitting relation between said portions,
   said spring means providing substantially the entire vertical-load-transmitting spring structure between said fifth wheel member and said ground-engaging wheels, and
   means providing a longitudinally extending draft tongue mounted in horizontal-load-transmitting relation to said assembly.

2. The fifth wheel dolly defined in claim 1 wherein said draft tongue extends forwardly of said assembly, the axis of said fulcrum mount being forward of the axis of said axle means.

3. The fifth wheel dolly defined in claim 1 wherein said draft tongue extends forwardly of said assembly, said fifth wheel member, lever means, and spring means forming a unit which has a center of gravity rearward of the axis of said axle means, whereby to counterbalance at least in part the weight of said draft tongue.

4. The fifth wheel dolly defined in claim 1 wherein said axle means comprises a single axle, said frame including a pair of laterally spaced upright pedestals on said axle and a brace extending between the upper portions of said pedestals substantially parallel to said axle, and trunnion blocks atop said pedestals forming members of said fulcrum mount.

5. The fifth wheel dolly defined in claim 1 wherein said axle means comprises a single axle, said frame including a pair of laterally spaced upright pedestals on said axle, a brace extending between the upper portions of said pedestal substantially parallel to said axle, and trunnion blocks atop said pedestals forming members of said fulcrum mount, said draft tongue extending forwardly of said assembly, the axis of said fulcrum mount being forward of the axis of said axle, said fifth wheel member, lever means, and spring means forming a unit which has a center of gravity rearward of the axis of said axle, whereby to counterbalance at least in part the weight of said draft tongue.

6. The fifth wheel dolly defined in claim 1 wherein said spring means comprises air spring means.

7. The fifth wheel dolly defined in claim 1 wherein said draft tongue comprises an open framework which includes a first pair of members secured to opposite side portions of an upper portion of said frame and extending generally horizontally forwardly at an angle toward each other, and a second pair of members secured to opposite side portions of a lower portion of said frame and extending upwardly forwardly at an angle toward each other, a draft attachment and means securing said attachment in draft-transmitting relation to the forward end portion of said pairs of members.

8. The fifth wheel dolly defined in claim 7 wherein said frame comprises a pair of laterally spaced upright pedestals on said axle means, said pairs of members being connected to said pedestals.

9. The fifth wheel dolly defined in claim 1 wherein said frame comprises a pair of laterally spaced upright pedestals on said axle means, said draft tongue including members secured directly to said pedestals at their rearward portions and having means at their forward portions forming a draft attachment.

References Cited

UNITED STATES PATENTS

| | | | |
|---|---|---|---|
| 2,733,931 | 2/1956 | Reid et al. | |
| 3,137,515 | 6/1964 | Masser | 280—440 |
| 3,203,711 | 8/1965 | Chew | 280—423 X |
| 3,246,912 | 4/1966 | Cunha | 280—407 |
| 3,347,563 | 10/1967 | Harbers | 280—415 X |
| 3,312,479 | 4/1967 | Cunha | 280—415 X |
| 3,413,015 | 11/1968 | Fontaine | 280—415 |
| 3,421,778 | 1/1969 | Barker et al. | 280—407 X |

LEO FRIAGLIA, Primary Examiner

U.S. Cl. X.R.

280—415, 440, 475